July 23, 1935.  C. A. GUSTAFSON  2,008,908
ROAD FINISHING MACHINE
Filed Sept. 5, 1933  4 Sheets-Sheet 2
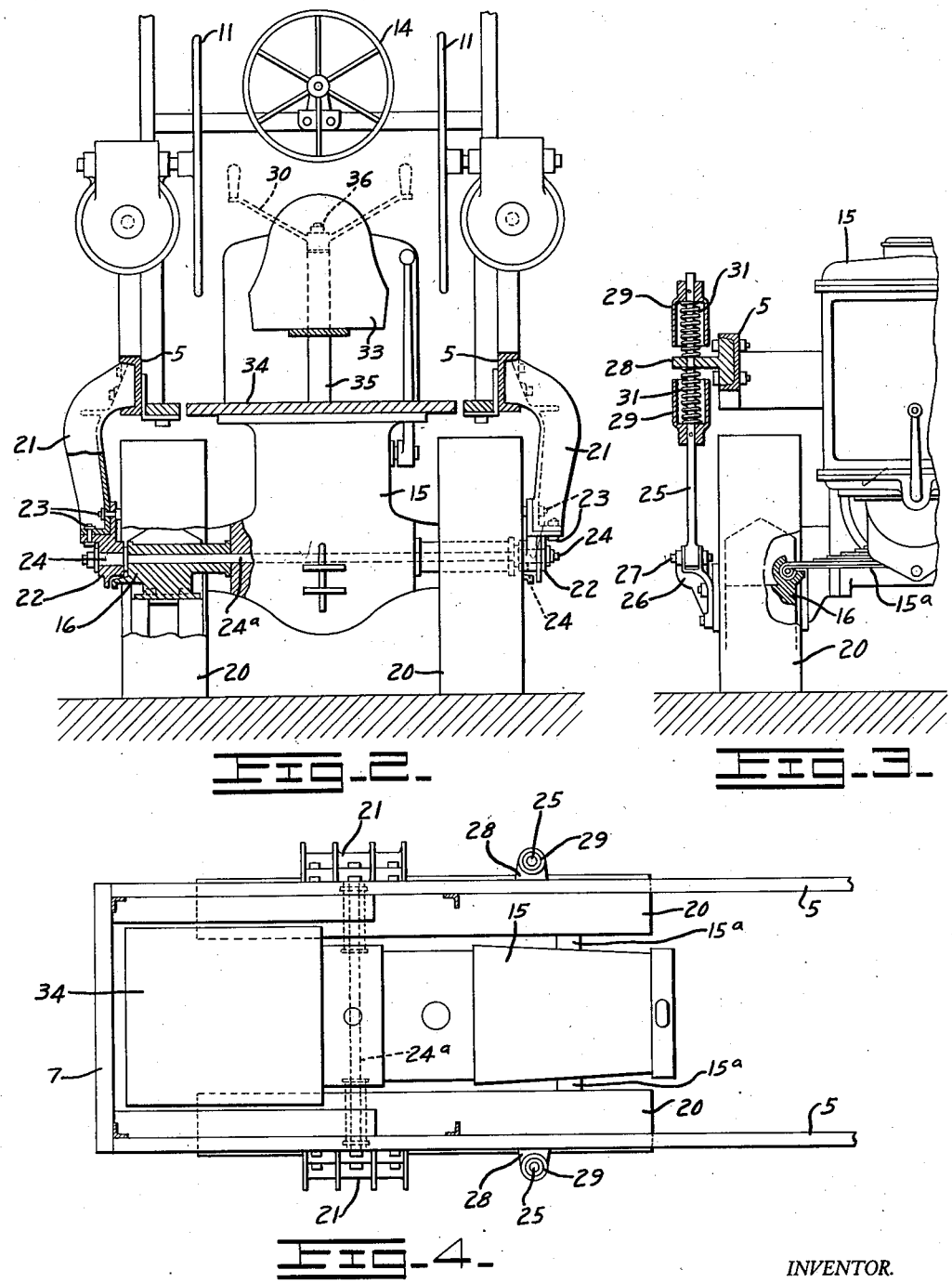
INVENTOR.
CARL A. GUSTAFSON
BY
ATTORNEY.

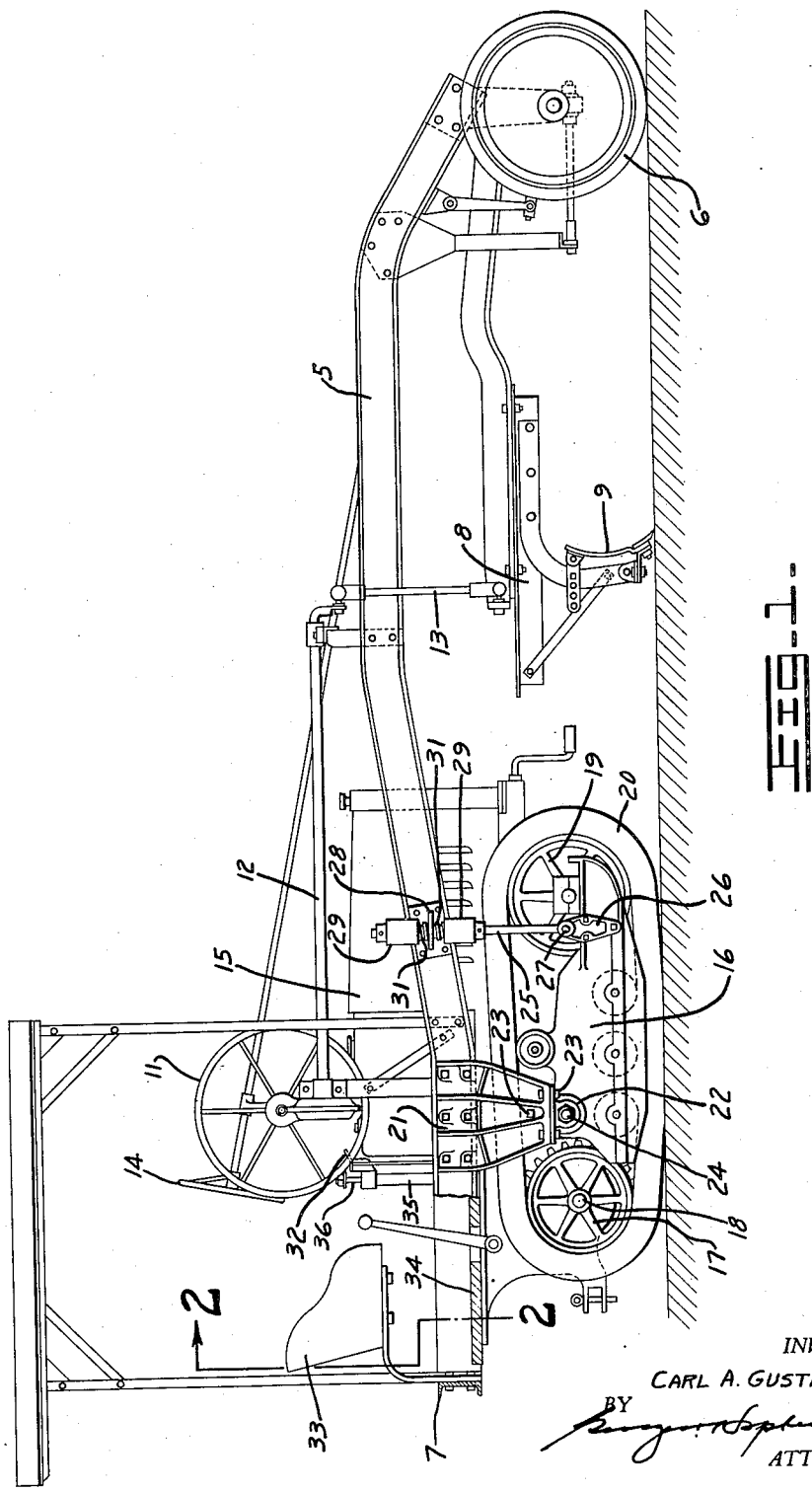

July 23, 1935.  C. A. GUSTAFSON  2,008,908
ROAD FINISHING MACHINE
Filed Sept. 5, 1933  4 Sheets-Sheet 3
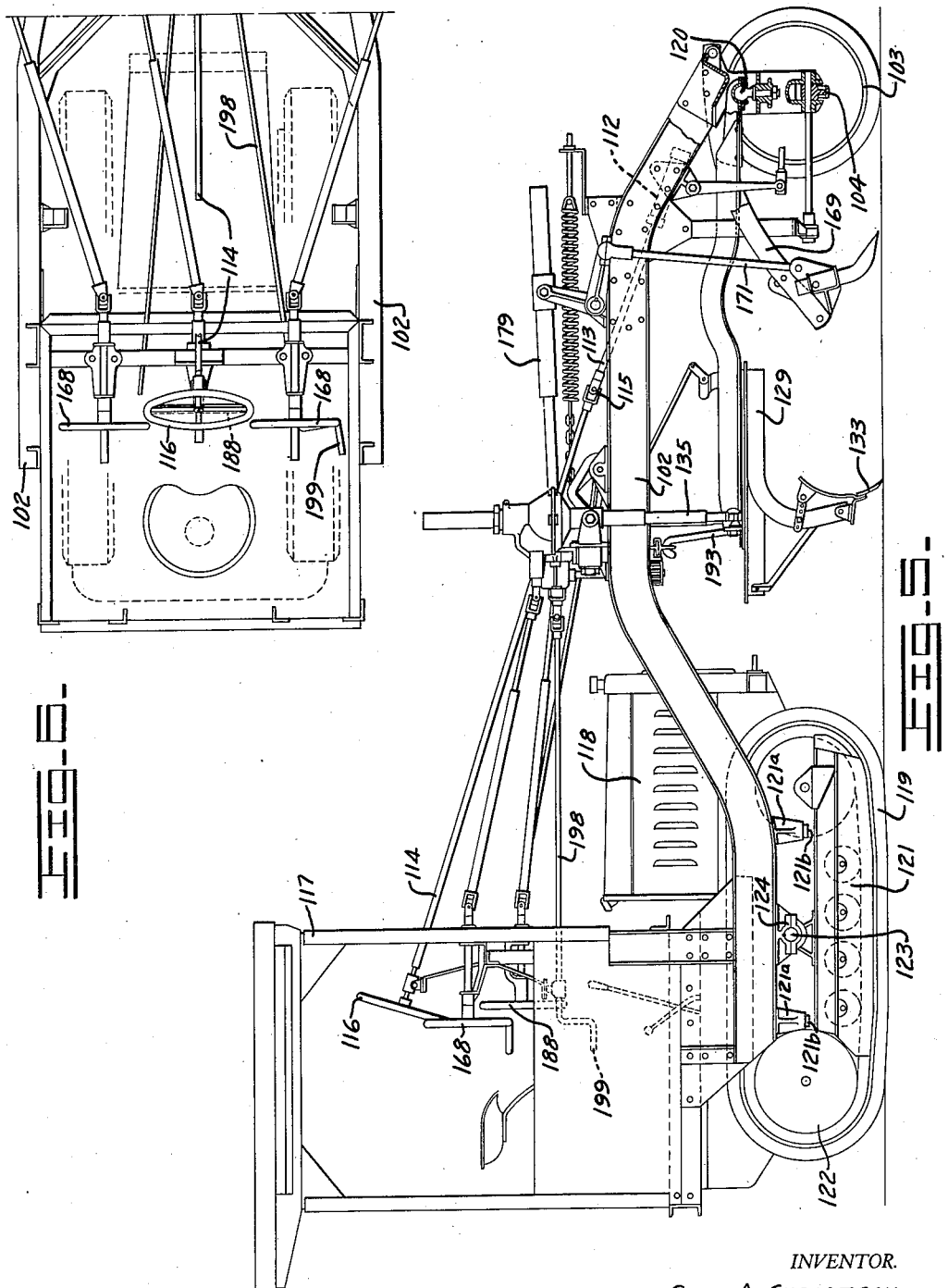
INVENTOR.
CARL A. GUSTAFSON
BY
ATTORNEY.

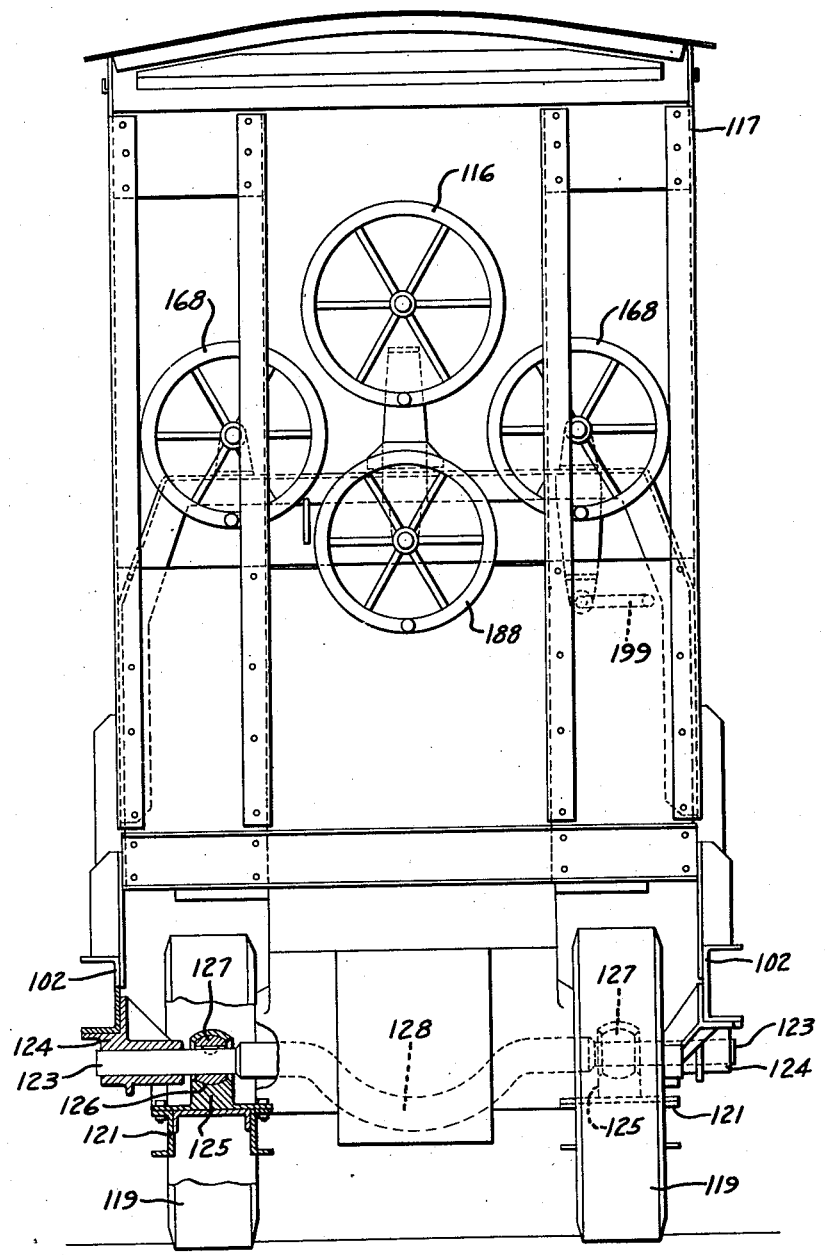

Patented July 23, 1935

2,008,908

UNITED STATES PATENT OFFICE 2,008,908

ROAD FINISHING MACHINE

Carl A. Gustafson, Peoria, Ill., assignor to Caterpillar Tractor Co., San Leandro, Calif., a corporation of California Application September 5, 1933, Serial No. 688,143

53 Claims. (Cl. 37—156)

This invention relates to improvements in road machines which employ an implement or main frame of the machine provided with a suitable scraper or ground-working implement, the forward end of said frame being supported upon guide wheels, and its rear end being secured to a tractor or power unit whereby the frame and tractor may be utilized as a unitary structure, means being provided by which an operator, located at a convenient position, may steer or guide the unitary structure and control the operation of the tool or scraper blade positioned beneath the implement frame.

This application is a continuation in part of my copending application, Serial No. 132,201, filed August 28, 1926, and Serial No. 340,425, filed February 16, 1929.

It is an object of the invention to provide a road machine in which the implement frame is detachably connected to a tractor or power unit.

Another object of the invention is to provide a road machine in which a power unit or plant is connected to an implement or main frame of the machine for movement with respect thereto.

Another object of the invention is to provide a motion controlling connection between the implement frame of a road machine and the main frame and track bearing auxiliary frames of the power unit or plant of a road machine.

Other objects of the invention will appear from the following description and the accompanying drawings, and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figs. 1-4 illustrate one form of the invention.

Fig. 1 is a side elevation of the machine.

Fig. 2 is a cross-sectional view on the line 2—2 of Fig. 1, partially broken away.

Fig. 3 is a detail sectional view illustrating the yieldable connection between one of the power plant traction devices and the implement frame for limiting the oscillatory movement of the traction device with respect to the implement frame.

Fig. 4 is a diagrammatic plan view showing the position of the power plant or unit between the side beams of the implement frame.

Figs. 5-7 illustrate a second form of the invention.

Fig. 5 is a side elevation.

Fig. 6 is a diagrammatic plan view showing the position of the power unit between the side beams of the implement frame; and Fig. 7 is a rear elevation with one pivotal connection between the power unit and the implement frame shown in section.

In the first embodiment of the invention, shown in Figs. 1-4, there is illustrated, for purposes of disclosure, a road finishing machine comprising an implement or main frame including side beams 5—5 having their forward ends supported upon carrying wheels 6, and their rear ends secured together by means of a cross member 7. The usual tool-supporting frame 8 is connected with the forward portion of the implement frame and has the usual scraper blade 9 adjustably mounted thereon as shown in Figure 1. The tool-supporting frame 8 is operable by means of hand wheels 11 connected therewith through crankshafts 12 and connecting rods 13. The front wheels 6 are pivotally mounted for steering of the machine and are operable by means of a hand wheel 14 whereby they may be swung upon their pivots to guide the machine.

A feature of this invention resides in the novel means provided for connecting the rear end portion of the implement frame with a power unit or tractor, whereby the power unit or tractor will provide a support therefor and also a means for propelling the machine. The power unit 15 here shown is a track-type or crawler tractor and is provided with a main frame and traction devices including auxiliary track-bearing frames 16. Idler wheels 19 are mounted in the forward ends of auxiliary frames 16 and tracks 20 are mounted upon these idler wheels and upon the drive sprockets 17 arranged on the drive shafts 18 mounted in the main frame of power unit 15 and driven by suitable transmission mechanism. Suitable truck rollers (indicated in dotted lines in Fig. 1) are mounted on auxiliary frames 16 and transmit the load to the ground stretch of tracks 20. These parts as here shown are all of ordinary construction. The main frame of power unit 15 is supported upon a cross-shaft 24a, that is mounted in auxiliary frames 16, the ends of the shaft projecting beyond said frames and forming trunnions or pivots 24 upon which the implement frame is pivoted as hereinafter pointed out.

The forward portion of the main frame of the power unit 15 is supported upon auxiliary frames 16 by means of the springs 15a as shown in Figs. 3 and 4.

I provide an implement frame consisting of side beams 5—5 provided with depending brackets 21 detachably secured thereto. These brackets preferably have journal boxes or brackets 22 demountably secured thereto, as by suitable bolts 23 (see Fig. 2). The terminals 24 of the shaft 24a form trunnions or pivots upon which the side beams 5 of the implement frame are pivotally supported by means of the depending brackets 21 and journal brackets 22.

The shaft 24a and the trunnions 24 are mounted in the main frame of power unit 15 and auxiliary frames 16 adjacent the drive shafts 18 and forwardly thereof, thus permitting the forward end of the power unit to oscillate with respect to the implement frame and at the same time, through the pivotal connection between the main frame and the auxiliary track-bearing frames of the power unit, normally holding the tracks in full contact with the road surface.

Means in the form of a motion controlling connection, is provided for limiting the oscillatory movement of the power unit with respect to the implement frame, and comprises rods 25 having their lower ends pivotally connected with the forward end portions of auxiliary frames 16 by means of forked brackets 26 and pins 27, and their upper end slidably mounted in guides 28 secured to the side beams 5 of the implement frame. (See Fig. 3). Cup-shaped members 29 are secured to the rods 25 at opposite sides of the guides 28 and have their adjacent ends spaced from the guides as shown in Fig. 3, to permit vertical movement of the rods 25 with respect to the guides and said implement frame. Suitable compression springs 31 are coiled about the rods 25 above and below the guides 28, and have their terminals bearing against the guides and the bottoms of the cup-shaped receptacles 29, thus tending normally to retain the guides 28 centrally between the cup-shaped members 29. By means of the motion controlling connection which the described mounting of members 25 provides and the motion controlling connection between the main frame of the power unit and the auxiliary frames of the power unit, the oscillatory movement of the forward end of the power unit with respect to the implement frame is limited to a predetermined degree, governed by the spaces or gaps provided between the adjacent ends of the cup-shaped members 29 and the opposed faces of the guides 28. It is to be noted that cup-shaped members 29 partially enclose springs 31 to protect the said springs from any foreign matter that would interfere with their operation, as well as serving as stops.

By connecting the implement or main frame 5 of the machine to the auxiliary frames 16 of the traction devices as above described, the power unit or tractor will be positioned between the side beams 5 of the implement frame as shown in Fig. 4, the tractor substantially becoming a part of the machine. When thus arranged the usual steering bar 30 of the tractor shown in dotted lines in Fig. 2, is dispensed with and the machine is guided by means of the steering wheel 14, controlling the swinging movements of the forward guide wheels 6.

The usual control mechanism 32 (Fig. 1) of the tractor may be carried by the tractor while the operator's seat 33 may be supported upon the cross member 7 of the implement frame as shown in Fig. 1. The steering wheel 14 and scraper blade adjusting wheels 11 are preferably carried by the implement frame and are not affected by the oscillatory movement of the tractor with respect to the implement frame. The tractor may also be provided with a platform 34 for the convenience of the operator. By thus pivotally connecting the tractor with the implement frame, the tracks 20 of the tractor will independently follow the surface of the roadway without exerting unnecessary strains upon the implement frame, as would be the case if the tractor were rigidly connected with the frame. It is readily seen that unlimited oscillatory movement of the tractor, or power unit with respect to the implement frame not only interferes with manipulation of the controls by the operator, who is either standing on the platform, or seated within the cab on the implement frame, but is also apt to injure him.

The limiting mechanism provided between the auxiliary track bearing frames 16 and the implement frame will prevent the tractor from oscillating beyond a predetermined degree with respect to the implement frame, which might cause serious injury to the operator or damage to the machine, should the forward end of the tractor encounter a comparatively large bump in the roadway or drop into a deep depression therein. Rods 25, springs 31 and associated members serve as a motion controlling connection which opposes upward and downward movement of the traction devices including auxiliary frames 16 of the power unit with respect to the implement frame about the axis of shaft 24a, and also serves to limit such movement positively. Spring 15a serves as a motion controlling connection between the main frame of the power unit and the traction devices thereof, and also serves with auxiliary frames 16, rods 25, spring 31 and associated members as a motion controlling connection between the power unit or tractor and the implement frame. The connecting means between the implement frame and tractor is also very simple and inexpensive, and as a result of the journal brackets 22 being demountably connected to the supporting brackets 21, the tractor may be readily disconnected from the implement frame, when desired, in a comparatively short time. To make such disconnection of the tractor from the implement frame, the journal brackets 22 are disconnected from the supporting brackets 21 and the trunnions consisting of the ends of the shaft 24, after which the rear portion of the implement frame may be lifted clear of the tractor and the latter removed therefrom. The disconnection can also be made by removing the bolts securing brackets 21 to the implement frame. In either manner of disconnection, pins 27 are removed from brackets 26. Thus, it is seen that the bracket means supporting the implement frame on the tractor can be considered as mounted on the tractor and detachably connected to the implement frame, or as mounted on the implement frame and detachably connected to the tractor or power unit.

In the second embodiment of the invention, shown in Figs. 5 through 7, there is illustrated a road grader comprising an implement frame including side beams 102—102, supported at their forward ends by suitable guide wheels 103 on axle 104. The steering mechanism 112 for guide wheels 103 is of conventional construction and is operated by shaft 113 connected to telescopic steering shaft 114 by universal joint 115. Steering wheel 116 is mounted on shaft 114 within the usual cab 117.

The rear portion of the implement frame is supported upon power unit or tractor 118, having suitable tracks or traction belts 119 on auxiliary track-bearing frames 121. Tracks 119 are driven by suitable drive members or sprockets 122 connected with the tractor transmission in the tractor main frame in the usual manner. The connections between the implement frame and the auxiliary track bearing frames of the tractor consist of shaft 123 having its terminals secured in suitable brackets 124, fastened to side beams 102—102 of the implement frame.

I prefer to mount the implement frame on auxiliary track bearing frames 121 of the power unit or tractor by supports of ball and socket type which, as here shown, are arranged as follows:

Split bracket 125 (Fig. 7) is secured to each auxiliary frame 121 and has spherical seat 126 adapted to receive a correspondingly shaped member 127, secured to shaft 123 as shown at the left-hand side of Fig. 7, thereby providing in effect ball and socket joints between the implement frame and auxiliary track frames 121 of the power unit. One of the spherical members 127 is preferably slidable on shaft 123 to allow for variation in the width of the main frame. The intermediate portion 128 of shaft 123 is preferably depressed or curved downwardly to provide clearance for the body or main frame of the tractor or power unit. It will thus be seen that the rear portion of the implement frame is pivotally supported upon the tractor or power unit, the ends 123 of non-rotatable cross shaft 123 cooperating with brackets 125 and members 127 to provide pivotal connections therebetween. Bumpers 121a (Fig. 5) having rubber blocks 121b at their lower ends, are pendently secured to each side beam 102 of the implement frame and are adapted to engage respective track or auxiliary frames 121 to limit oscillatory movement of the tractor or power unit with respect to the implement frame.

Earth-engaging tools are adjustably mounted on the implement frame forwardly of the power unit. The usual blade or ground working tool 133 (Fig. 5) is adjustably secured to blade supporting frame 129 which has a draft connection with the implement frame at 120, and is adjustably supported thereupon by suitable telescopic lift rods or links 135 and center shift link 193. Lift links 135 and center shift link 193 are controlled through hand wheels 168 and 188, respectively, to adjust tool 133 with respect to the ground.

Forwardly of blade 133, scarifier 169 is provided having a suitable draft connection with the implement frame and adjustably supported thereupon by lift rods 171. The scarifier is adjusted with respect to the ground by means including telescopic adjusting mechanism 179 operated through shaft 198 by crank 199 in cab 117.

From the foregoing description it is seen that the second form of the invention provides a simple and sturdy mounting for an implement frame on a power unit. It is to be noted that the mounting provides for limited movement of the power unit with respect to the implement frame about the axis of shaft 123, such oscillatory movement of the power unit being limited by resilient means including blocks 121B which are adapted to engage auxiliary track-bearing frames 121.

I, therefore, claim as my invention:

1. In combination, a tractor, a wheeled frame having one end supported upon the tractor, supporting brackets secured to the frame, journal brackets secured to said supporting brackets, trunnions on said tractor adapted to receive said journal brackets to provide pivotal connections between tractor and frame, and the end of the tractor having a second connection with the frame functioning to limit oscillatory movement of the tractor.

2. In combination, a crawler-type tractor including auxiliary frames and tracks thereon, a wheeled frame having one end supported upon the tractor, depending supporting brackets secured to said wheeled frame rearwardly thereof, journal brackets demountably secured to said supporting brackets, trunnions secured to said auxiliary frames adapted to receive said journal brackets to provide pivotal connections between tractor and wheeled frame whereby the tractor may oscillate with respect to said frame, and the forward ends of said auxiliary frames having a restricted slidable connection with the wheeled frame whereby oscillatory movement of the tractor will be limited.

3. In combination, a crawler-type tractor including auxiliary frames and tracks thereon, an implement frame having one end carried by guide wheels and its other end pivotally connected to the tractor rearwardly thereof, guides on said implement frame, rods pivotally connected to the forward portions of said auxiliary frames and guidingly supported in said guides, cup-shaped members secured to said rods at opposite sides of said guides, and spring elements mounted in said members and engaging said guides to yieldingly restrict oscillatory movement of the tractor with respect to the implement frame, said cup-shaped members being adapted to abut against said guides.

4. In combination, a crawler-type tractor including auxiliary frames and tracks thereon, an implement frame having one end carried by guide wheels and its other end pivotally connected to the tractor rearwardly thereof, guides on said implement frame, upright rods pivotally connected to the forward portions of said auxiliary frames and guidingly supported in said guides, cup-shaped members secured to said rods at opposite sides of said guides and spaced therefrom, and spring elements mounted in said members and opposingly engaging said guides to independently yieldingly restrict oscillatory movement of said auxiliary frames with respect to the said implement frame, said cup shaped members being adapted to abut against said guides.

5. In combination, a tractor of the crawler-type comprising a main frame, drive shafts and auxiliary frames having tracks thereon adapted to be driven by said shafts, an implement frame having its rearward portion pivotally connected with rearward portions of said auxiliary frames and having its forward portion supported upon suitable guide wheels, the pivotal connections between said implement frame and said auxiliary frames permitting independent oscillatory movement of said main frame, and means connecting the forward portions of said auxiliary frames with said implement frame and adapted to yieldingly restrict oscillatory movement of said auxiliary frames.

6. In combination, a tractor of the crawler type comprising a main frame, drive shafts and auxiliary frames having tracks thereon adapted to be driven by said shafts, an implement frame having its rearward portion pivotally connected with rearward portions of said auxiliary frames and having its forward portion supported upon suitable guide wheels, the pivotal connections between said implement frame and said auxiliary frames permitting independent oscillatory movement of said main frame, means for limiting oscillatory movement of said auxiliary frames, said limiting means comprising rods having their lower ends pivotally connected with said auxiliary frames and having their upper portions slidably supported in guides secured to said implement frame, and oppositely facing cup-shaped members secured to the rods and having springs therein engaging said guides to yieldably limit movement of the rods in either direction.

7. In combination, a tractor, a wheeled frame having one end supported upon the tractor, supporting brackets secured to the frame, journal brackets secured to said supporting brackets, trunnions on said tractor adapted to receive said journal brackets to provide pivotal connections between tractor and frame, and a second connection between the tractor and the frame functioning to limit oscillatory movement of the tractor.

8. In combination, a crawler-type tractor including a main frame and auxiliary track-bearing frames, a wheeled frame having one end supported upon the tractor, depending supporting brackets secured to the frame, journal brackets secured to said supporting brackets, trunnions adjacent said auxiliary frames adapted to receive said journal brackets to provide pivotal connections between said tractor and said wheeled frame whereby the tractor may oscillate with respect to said frame, and restricted slidable connections between said auxiliary frames and said wheeled frame whereby oscillatory movement of the tractor will be limited.

9. In combination an implement frame, a power unit comprising a main frame and traction devices having auxiliary frames, said frames being pivoted on a common axis, and motion controlling connections between said implement frame and said auxiliary frames and between said main frame and said auxiliary frames.

10. In combination an implement frame, a power unit comprising a main frame and traction devices having auxiliary frames, said frames being pivoted on a common axis, and resilient motion controlling connections between said implement frame and said auxiliary frames and between said main frame and said auxiliary frames.

11. In combination, a crawler-type tractor including an auxiliary track-bearing frame, an implement frame pivotally supported on said tractor and having a ground contacting support, a connection between said auxiliary frame and said implement frame comprising a guide on one of said frames and a rod connected to the other of said frames and engaging said guide, members on said rod at opposite sides of said guide, and spring elements engaging said members and said guide to yieldingly restrict oscillatory movement of said frames.

12. In combination, a crawler-type tractor including track-bearing frames and tracks thereon, an implement frame having one end carried by wheels and its other end pivotally connected to the tractor, guides on said implement frame, upright rods pivotally connected to said auxiliary frames and guidingly supported in said guides, cup-shaped members secured to said rods at opposite sides of said guides and spaced therefrom, and spring elements mounted in said members and opposingly engaging said guides to independently yieldingly restrict oscillatory movement of said auxiliary frames with respect to the said implement frame.

13. In combination, a tractor of the crawler type comprising a drive shaft and track-bearing frames having tracks thereon adapted to be driven by said shaft, an implement frame pivotally connected with said auxiliary frames and supported upon wheels, the pivotal connections between said implement frame and said auxiliary frames permitting independent oscillatory movement thereof, and means for limiting oscillatory movement thereof, said limiting means comprising rods having their lower ends pivotally connected with said auxiliary frames and having their upper portions slidably supported in guides secured to said implement frame, and oppositely facing cup-shaped members secured to the rods and having springs therein engaging said guides to yieldably limit movement of the rods in either direction.

14. In combination, a crawler-type tractor including an auxiliary track-bearing frame, an implement frame pivotally supported on said tractor and having a ground contacting support, a connection between said auxiliary frame and said implement frame comprising a guide on one of said frames and a rod connected to the other of said frames and slidably engaging said guide, cup-shaped members secured to said rod on opposite sides of said guide, and spring elements seated in said cup-shaped members and engaging said guide.

15. In combination, a crawler-type tractor including auxiliary track-bearing frames and tracks thereon, an implement frame having one end carried by wheels and its other end pivotally connected to the tractor, guides on said implement frame, rods pivotally connected to said auxiliary frames and guidingly supported in said guides, cup-shaped members secured to said rods at opposite sides of said guides, and spring elements mounted in said members and engaging said guides to yieldingly restrict oscillatory movement of the tractor with respect to the implement frame.

16. In combination, a power unit including a main frame, traction devices supporting said main frame disposed on either side thereof, and drive shafts for said traction devices, an implement frame, comprising spaced side members, steerable front supports for said side members, brackets for supporting said implement frame on said power unit, said brackets having pivotal connections with said power unit to provide for oscillatory movement of said power unit with respect to said implement frame, an earth-engaging tool adjustably supported from said implement frame between said power unit and said steerable front supports, and a connection from said power unit to said implement frame forwardly of said brackets, said connection providing resilient means resisting oscillatory movement between said power unit and said implement frame about the axis of said pivotal connections between said brackets and said power unit, and including means positively limiting oscillatory movement between said power unit and said implement frame.

17. In combination, a power unit, a wheeled frame having one end supported upon the power unit, supporting brackets secured to the frame, journal brackets secured to said supporting brackets, trunnions on said power unit adapted to receive said journal brackets to provide pivotal connections between said power unit and said frame, and a second connection between said power unit and said frame functioning to limit oscillatory movement of said power unit with respect to said frame.

18. In combination, a power unit, a wheeled frame having one end supported upon the power unit, supporting brackets secured to the frame, journal means adapted for connection to said supporting brackets, journal stations on said power unit adapted to receive said journal means to provide pivotal connections between said power unit and said frame, and a second connection between said power unit and said frame functioning to limit oscillatory movement of said power unit with respect to said frame.

19. In combination, an implement frame, a power unit, comprising a main frame and traction devices, means for pivoting said frames about a common axis, comprising journal stations on one of said frames, and brackets on the other of said frames, and a motion controlling connection between said frames.

20. In combination, a power unit, including a frame, an implement frame pivotally supported on said power unit, and having a ground-contacting support, a connection between said frames comprising a member on one of said frames, opposed elements connected to the other of said frames, said member being positioned between but spaced from said elements, and resilient elements interposed between said respective opposed elements and said member to yieldingly restrict oscillatory movement of said frames, said resilient elements being partially enclosed.

21. In combination, a power unit including a frame, an implement frame pivotally supported on said power unit and having a ground-contacting support, a connection between said frames comprising a plurality of spaced members connected to said frames, and resilient elements interposed between said members to yieldingly restrict oscillatory movement of said frames, said resilient elements being partially enclosed by certain of said members.

22. In combination, a power unit including a main frame, traction devices supporting said main frame disposed on either side thereof, and drive shafts for said traction devices, an implement frame, comprising spaced side members, steerable front supports for said implement frame, bracket means providing a pivotal supporting connection for said implement frame on said power unit, whereby said power unit can oscillate with respect to said implement frame; an earth-engaging tool adjustably supported from said implement frame between said front supports and said power unit, and a resilient connection between said power unit main frame and said implement frame, including a resilient member extending transversely of said frames.

23. In combination, an implement frame, steerable front supports for said implement frame, an earth-engaging tool adjustably supported on said implement frame, a power unit including a main frame, drive shafts in said main frame, drive wheels on said drive shafts for propelling said implement frame and said power unit, bracket means providing aligned pivotal connections between said implement frame and said main frame whereby said power unit can oscillate with respect to said implement frame, and a resilient connection between said implement frame and said power unit for resiliently opposing oscillatory movement of said power unit with respect to said implement frame.

24. In a road machine, an implement frame, steerable front supports for said implement frame, an earth-engaging tool adjustably supported from said implement frame, a power unit including a main frame and traction devices, each traction device including an auxiliary frame, wheels adjacent each end of said auxiliary frame which rotate when the machine is in motion, each auxiliary frame having a pivotal connection with said main frame positioned between said wheels, and means for mounting said implement frame on said power unit, including bracket means providing aligned pivotal connections, and resilient means resisting oscillatory movement of said power unit with respect to said implement frame, said resilient means including partially enclosed resilient elements.

25. In a road machine, an implement frame, steerable front supports for said implement frame, an earth-engaging tool adjustably supported from said implement frame, a power unit including a main frame and traction devices, each traction device including an auxiliary frame, a sprocket wheel adjacent one end of each auxiliary frame, an idler wheel adjacent the other end of each auxiliary frame, said wheels being adapted to rotate when the machine is in motion, an endless track around said wheels, each auxiliary frame having a pivotal connection with said main frame positioned between said sprocket wheel and said idler wheel, and means for mounting said implement frame on said power unit including pivotal connections, and a resilient connection adapted to limit oscillation of said power unit with respect to said implement frame.

26. In a road machine, an implement frame, steerable front supports for said frame, an earth-engaging tool adjustably supported on said frame, means on said implement frame providing an operator's station, control means for steering said supports and adjusting said tool located at said operator's station and mounted on said implement frame, a power unit, including a main frame and traction devices, control means for said power unit positioned in said operator's station whereby all the controls are positioned at the operator's station, and means for mounting said implement frame on said power unit including pivotal connections providing oscillatory movement, and a resilient connection yieldably restricting such oscillatory movement.

27. In a road machine, an implement frame, steerable front supports for said frame, an earth-engaging tool adjustably supported on said frame, means on said implement frame providing an operator's station, control means for steering said supports and adjusting said tool located at said operator's station and mounted on said implement frame, a power unit, including a main frame and traction devices, each traction device including an auxiliary frame, wheels adjacent each end of said auxiliary frame which rotate when the machine is in motion, each auxiliary frame having a pivotal connection with said main frame positioned between said wheels, control means for said power unit positioned in said operator's station whereby all the controls are positioned at the operator's station, and means for mounting said implement frame on said power unit including pivotal connections providing oscillatory movement, and a resilient connection yieldably restricting such oscillatory movement.

28. In a road machine, an implement frame, steerable front supports for said frame, an earth-engaging tool adjustably supported on said frame, means on said implement frame providing an operator's station, control means for steering said supports and adjusting said tool located at said operator's station and mounted on said implement frame, a power unit, including a main frame and traction devices, each traction device including an auxiliary frame, a sprocket wheel adjacent one end of each auxiliary frame, an idler wheel adjacent the other end of each auxiliary frame, said wheels being adapted to rotate when the machine is in motion, an endless track around said wheels, each auxiliary frame having a pivotal connection with said main frame positioned between said sprocket wheel and said idler wheel, control means for said power unit positioned in said operator's station whereby all the controls are positioned at the operator's station, and means for mounting said implement frame on said power unit including pivotal connections providing oscillatory movement, and a resilient connection yieldably restricting such oscillatory movement.

29. In a road machine, an implement frame, steerable front supports for said frame, an earth-engaging tool adjustably supported on said frame, a power unit including a main frame and traction devices, and means for mounting said implement frame on said power unit, including bracket connections providing for relative oscillatory movement between said power unit and said implement frame, and a resilient connection, each said bracket connection being detachable from both said power unit and said implement frame, said resilient connection between said implement frame and said power unit yieldably resisting relative oscillatory movement thereof.

30. In a road machine, an implement frame, steerable front supports for said frame, an earth-engaging tool adjustably supported on said frame, a power unit including a main frame and traction devices, and means for mounting said implement frame on said power unit, including brackets on said implement frame and adapted for detachable connection to said power unit, said brackets providing pivotal connections between said power unit and said implement frame, and a resilient connection between said power unit and said implement frame adapted to yieldably restrict relative oscillatory movement about said pivotal connections.

31. In combination, a tractor including a main frame, and traction devices comprising auxiliary frames, driving sprocket wheels, idler wheels, and endless tracks, an implement frame, steerable front supports for said implement frame, an earth-engaging tool adjustably supported on said implement frame, means for supporting said implement frame on said tractor to provide for oscillatory movement of said tractor with respect thereto, and members connecting said auxiliary frames to said implement frame, each member being adapted for resilient connection at one end, and for pivotal connection at the other end.

32. In combination, a tractor main frame, track-bearing supporting frames therefor pivotally connected thereto, tracks on said track bearing frames, shafts coaxially arranged and mounted in said main frame adjacent the rear thereof, sprockets on said shafts and having driving engagement with said tracks, the axis of rotation of said sprockets being spaced from the pivotal axis of said auxiliary frames and an implement frame pivotally supported on said track-bearing frames on the axis of the pivotal connection between said main frame and said track bearing frames.

33. In combination, a tractor of the crawler type comprising a main frame, drive shafts, and auxiliary traction frames having tracks thereon adapted to be driven by said shafts, an implement frame having its rearward portion pivotally connected with said auxiliary frames and having its forward portion supported on guide wheels, the pivotal connections between said implement frame and said auxiliary frames permitting independent oscillatory movement of said main frame, and means adjacent the forward portions of said auxiliary frames adapted to yieldingly restrict oscillatory movement of said auxiliary frames.

34. In combination, a crawler-type tractor including an auxiliary track-bearing frame, an implement frame, a ground contacting support for one end of said implement frame, and means connecting the other end of said implement frame and said auxiliary frame, comprising a movable connection and opposed resilient elements connected to one of said frames and engageable with the other of said frames to yieldingly restrict relative movement thereof about said connection.

35. In combination, a track-type tractor including track-bearing frames and tracks thereon, an implement frame, wheels supporting one end of said implement frame, and connections between the other end of said implement frame and said track-bearing frames comprising a pivot and opposed resilient elements yieldingly restricting relative oscillatory movement of said frames about said pivot.

36. In combination, a tractor of the crawler type comprising a drive shaft and auxiliary track-bearing frames having tracks thereon adapted to be driven by said shaft, an implement frame movably connected with said auxiliary frames and supported on wheels, the movable connections between said implement frame and said auxiliary frames providing independent oscillatory movement thereof, and means for limiting oscillatory movement thereof, said limiting means comprising opposed resilient elements adapted to yieldingly restrict such oscillatory movement, the opposed relation of said elements providing for restricted movement in both directions.

37. The combination with a track-type tractor having auxiliary track-bearing frames and tracks thereon; of an implement frame having steerable front supports, said implement frame having a portion normally in substantially parallel relation with each of said auxiliary frames; and means for mounting said implement frame on said tractor comprising a movable connection between each of said auxiliary frames and the associated portion of said implement frame, and resilient means interposed between said auxiliary frame and said portion to yieldingly restrict relative movement thereof about said movable connection.

38. The combination with a power unit including a main frame, traction devices supporting said main frame disposed on either side thereof, and drive shafts for said traction devices; of an implement frame having steerable front supports and an earth-engaging tool mounted thereon; and means for mounting said implement frame on said power unit including bracket means providing aligned pivotal connections between said power unit and said implement frame, and a connection from said power unit to said implement frame spaced from said pivotal connections, said connection providing resilient means resisting oscillatory movement between said power unit and said implement frame about the axis of said pivotal connections, said connection including means positively limiting oscillatory movement between said power unit and said implement frame.

39. In combination, a power unit including a main frame, traction devices supporting said main frame disposed on either side thereof, and drive shafts for said traction devices, an implement frame, comprising spaced side members, steerable front supports for said side members, brackets for supporting said implement frame on said power unit, said brackets having pivotal connections with said power unit to provide for oscillatory movement of said power unit with respect to said implement frame, and a connection from said power unit to said implement frame forwardly of said brackets, said connection providing resilient means resisting oscillatory movement between said power unit and said implement frame about the axis of said pivotal connections between said brackets and said power unit, and including means positively limiting oscillatory movement between said power unit and said implement frame.

40. In combination, a power unit including a main frame, traction devices supporting said main frame disposed on either side thereof and drive shafts for said traction devices, an implement frame, comprising spaced side members, steerable front supports for said implement frame, bracket means providing a pivotal supporting connection for said implement frame on said power unit, whereby said power unit can oscillate with respect to said implement frame, and a resilient connection between said power unit main frame and said implement frame, including a member extending transversely of said frames.

41. The combination with an implement frame having steerable front supports and an earth-engaging tool mounted thereon; of a power unit having a main frame, drive shafts in said main frame, drive wheels on said drive shafts for propelling said implement frame and said power unit; and means mounting said implement frame on said power unit including bracket means providing aligned pivotal connections between said implement frame and said power unit whereby said power unit can oscillate with respect to said implement frame, and a resilient connection between said implement frame and said power unit for resiliently opposing oscillatory movement of said power unit with respect to said implement frame.

42. In a road machine, an implement frame, steerable front supports for said implement frame, a power unit including a main frame and traction devices, each traction device including an auxiliary frame, wheels adjacent each end of said auxiliary frame which rotate when the machine is in motion, each auxiliary frame having a pivotal connection with said main frame positioned between said wheels, and means for mounting said implement frame on said power unit, including aligned pivotal connections, and resilient means resisting oscillatory movement of said power unit with respect to said implement frame.

43. In a road machine, an implement frame, steerable front supports for said frame, a power unit including a main frame and traction devices, and means for mounting said implement frame on said power unit, including bracket connections providing for relative oscillatory movement between said power unit and said implement frame, and a resilient connection, each said bracket connection having two points of disconnection whereby said implement frame can be removed from said power unit, said resilient connection yieldably resisting oscillatory movement of said implement frame and said power unit.

44. In a road machine, an implement frame, steerable front supports for said frame, a power unit including a main frame and traction devices, and means for mounting said implement frame on said power unit, including brackets on said power unit and adapted for detachable connection to said implement frame whereby aligned pivotal connections are provided between said power unit and said implement frame, and resilient means connecting said power unit and said implement frame yieldably opposing relative oscillatory movement thereof.

45. In combination, an implement frame, steerable front supports for said implement frame, a power unit having a main frame, drive shafts in said main frame, drive wheels on said drive shafts for propelling said implement frame and said power unit, aligned pivotal connections between said implement frame and said power unit whereby said power unit can oscillate with respect to said implement frame, and a motion controlling connection between said power unit and said implement frame for controlling relative movement therebetween.

46. In combination, an implement frame, steerable front supports for said implement frame, a power unit including traction devices for propelling said implement frame and said power unit, aligned pivotal connections between said implement frame and said power unit whereby said power unit can oscillate with respect to said implement frame, and a motion controlling connection between said power unit and said implement frame for controlling relative movement therebetween.

47. In combination, an implement frame having an earth-engaging blade mounted thereon, steerable front supports for said implement frame, a power unit including opposite traction devices operable to propel said implement frame and said power unit, each of said traction devices engaging the ground at a plurality of points lying in a line parallel to the longitudinal axis of said implement frame, aligned pivotal connections between said power unit and said implement frame, and a motion controlling connection between said power unit and said implement frame for controlling relative movement therebetween.

48. In combination, an implement frame having an earth-engaging blade mounted thereon, steerable front supports for said implement frame, a power unit including opposite traction devices operable to propel said implement frame and said power unit, each of said traction devices engaging the ground at a plurality of points lying in a line parallel to the longitudinal axis of said implement frame, aligned pivotal connections between said power unit and said implement frame, and a flexible connection between said power unit and said implement frame spaced from said pivotal connections, said flexible connection controlling relative movement between said power unit and said implement frame.

49. The combination with a track-type tractor having auxiliary track-bearing frames and tracks thereon; of an implement frame having steerable front supports, said implement frame having a portion normally in substantially parallel relation with each of said auxiliary frames; and means for mounting said implement frame on said tractor comprising a pivotal connection between each of said auxiliary frames and the associated portion of said implement frame intermediate the ends of said auxiliary frame and said associated portion of said implement frame, and resilient means interposed between each auxiliary frame and the associated portion of said implement frame at either side of said pivotal connection to yieldingly restrict relative pivotal movement of said frames.

50. The combination with a track-type tractor having an auxiliary track-bearing frame and a track thereon; of an implement frame having steerable front supports, said implement frame having means normally disposed in substantially parallel relation with said auxiliary frame; and means for mounting said implement frame on said tractor comprising a pivotal connection between said auxiliary frame and said implement frame means intermediate the ends of said auxiliary frame and said implement frame means, and resilient means interposed between said auxiliary frame and said implement frame means at either side of said pivotal connection to yieldingly restrict relative pivotal movement of said frame.

51. The combination with a track-type tractor having an auxiliary track-bearing frame and a track thereon; of an implement frame having steerable front supports, said implement frame having means normally disposed in substantially parallel relation with said auxiliary frame; and means for mounting said implement frame on said tractor comprising a pivotal connection between said auxiliary frame and said implement frame means intermediate the ends of said auxiliary frame and said implement frame means, said implement frame means and said auxiliary frame being adapted for engagement at either side of said pivotal connection to limit relative oscillatory movement of said frames.

52. In combination, a tractor of the crawler-type comprising a main frame, drive shafts and auxiliary frames having tracks thereon adapted to be driven by said shafts, an implement frame having its rearward portion pivotally connected with said auxiliary frames and having its forward portion supported upon suitable guide wheels, the pivotal connections between said implement frame and said auxiliary frames permitting independent oscillatory movement of said main frame, and resilient means between said auxiliary frames and said implement frame adapted to yieldingly restrict oscillatory movement of said auxiliary frames.

53. In combination, a crawler-type tractor including a frame, an implement frame pivotally supported on said tractor and having a ground contacting support, and a connection between said frames, a guide on one of said frames and a rod connected to other of said frames and engaging said guide, spaced abutment means on said rod at either side of said guide, and resilient elements between said abutment means and said guide to yieldingly restrict oscillatory movement of said frames.

CARL A. GUSTAFSON.